US 9,995,762 B2

(12) United States Patent
Hayashi et al.

(10) Patent No.: US 9,995,762 B2
(45) Date of Patent: Jun. 12, 2018

(54) ACCELERATION SENSOR

(71) Applicant: Hitachi Automotive Systems, Ltd., Hitachinaka-shi, Ibaraki (JP)

(72) Inventors: Masahide Hayashi, Ibaraki (JP); Heewon Jeong, Tokyo (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 70 days.

(21) Appl. No.: 15/129,963

(22) PCT Filed: Mar. 25, 2015

(86) PCT No.: PCT/JP2015/059015
§ 371 (c)(1),
(2) Date: Sep. 28, 2016

(87) PCT Pub. No.: WO2015/151946
PCT Pub. Date: Oct. 8, 2015

(65) Prior Publication Data
US 2017/0138981 A1 May 18, 2017

(30) Foreign Application Priority Data

Apr. 3, 2014 (JP) ................................. 2014-077078

(51) Int. Cl.
*G01P 15/125* (2006.01)
*G01P 15/08* (2006.01)

(52) U.S. Cl.
CPC .... *G01P 15/125* (2013.01); *G01P 2015/0834* (2013.01)

(58) Field of Classification Search
CPC .................................................. G01P 15/125

USPC ....................................................... 73/514.32
See application file for complete search history.

(56) References Cited

U.S. PATENT DOCUMENTS

| 5,905,203 A | 5/1999 | Flach et al. |
| 2007/0000323 A1 | 1/2007 | Kuisma |
| 2009/0081434 A1* | 3/2009 | Sturland .................. B01J 20/02 428/218 |

(Continued)

FOREIGN PATENT DOCUMENTS

| EP | 0 773 443 A1 | 5/1997 |
| JP | 9-189716 A | 7/1997 |

(Continued)

OTHER PUBLICATIONS

Extended European Search Report issued in counterpart European Patent Application No. 15772477.4 dated Nov. 24, 2017 (five (5) pages).

(Continued)

*Primary Examiner* — Walter L Lindsay, Jr.
*Assistant Examiner* — Philip Marcus T Fadul
(74) *Attorney, Agent, or Firm* — Crowell & Moring LLP

(57) ABSTRACT

Provided is a highly reliable acceleration sensor that keeps production costs low and has low zero point drift initially and over time even when used in a poor installation environment. In this acceleration sensor, a weight that rotates when acceleration is applied in the z-direction is disposed in a cavity surrounded by a support substrate and a cap layer. The cap layer is formed such that both sides thereof across the axis of rotation of the weight have different masses per unit area.

12 Claims, 7 Drawing Sheets

(56) References Cited

U.S. PATENT DOCUMENTS

| | | | |
|---|---|---|---|
| 2012/0167681 A1* | 7/2012 | Reinmuth | B81B 3/0078 |
| | | | 73/504.12 |
| 2013/0042684 A1 | 2/2013 | Yoda | |
| 2014/0174180 A1 | 6/2014 | Jeong et al. | |
| 2015/0210541 A1* | 7/2015 | Kang | B81B 7/0038 |
| | | | 257/415 |

FOREIGN PATENT DOCUMENTS

| | | |
|---|---|---|
| JP | 2000-19198 A | 1/2000 |
| JP | 2008-544243 A | 12/2008 |
| JP | 2009-2834 A | 1/2009 |
| JP | 5105968 B2 | 12/2012 |
| JP | 2013-40856 A | 2/2013 |
| WO | WO 2006/134232 A1 | 12/2006 |

OTHER PUBLICATIONS

International Search Report (PCT/ISA/210) issued in PCT Application No. PCT/JP2015/059015 dated Jun. 30, 2015 with English translation (Four (4) pages).

Japanese-language Written Opinion (PCT/ISA/237) issued in PCT Application No. PCT/JP2015/059015 dated Jun. 30, 2015 (Four (4) pages).

* cited by examiner

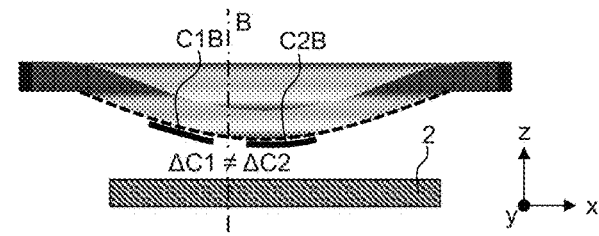
FIG. 6A
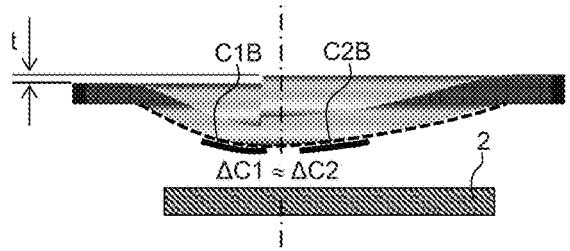
FIG. 6B
FIG. 7
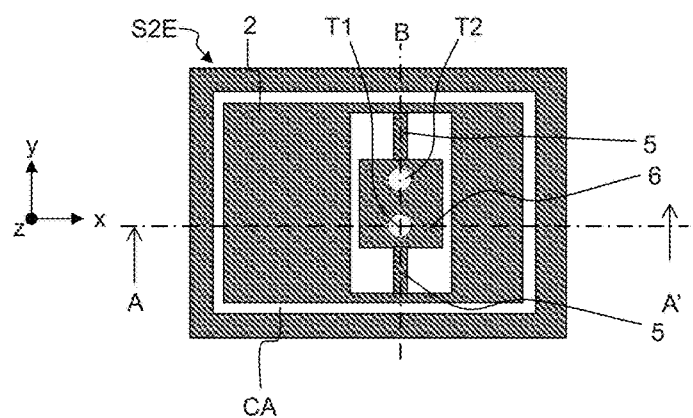

ACCELERATION SENSOR

TECHNICAL FIELD

The present invention relates to an acceleration sensor.

BACKGROUND ART

In recent years, laws and regulations are established for safety driving system of vehicles, such as electronic stability control, collision prevention, and parking assistance system. Further, various applications are being developed and popularized for controlling postures and motions, such as popularization of robots. Accordingly, needs and markets of MEMS (Micro-Electro Mechanical Systems) type acceleration sensors are growing rapidly. In connection with these, needs for measuring the out of plane direction acceleration is increasing. Further, highly reliable and low cost acceleration sensors are required, which have small drifts in sensor characteristic or over time variation (for example, zero point drift or sensitivity variation) even in a location with poor environmental conditions (in terms of temperature, humidity, and vibration) such as engine room of vehicles.

Generally, capacitance detection type acceleration sensor has: a proof mass that displaces corresponding to an applied acceleration; and a sensing electrode that forms capacitance with the proof mass. These components can be made from silicon substrate having multiple layers using photolithographic technology, etching technology, and substrate bonding technology.

In the acceleration sensor described in PTL 1, formed are: a proof mass on a device layer arranged in a plane defined with a first direction and a second direction perpendicular to the first direction; and a support substrate and a cap layer sandwiching the proof mass in a third direction (vertical direction) perpendicular to the first and second directions. The proof mass is plate-shaped and is hung by a support substrate through a torsion beam in a position away from the center of gravity part of the proof mass. Thus, when acceleration is applied in the third direction to the proof mass, the proof mass rotates around the first direction or the second direction. That is, since the rotation center of the proof mass is away from center of gravity part of the proof mass, moment arises in the rotation center in proportion to acceleration applied in the third direction. As a result, the proof mass is displaced toward the third direction.

The displacement of the proof mass in the third direction is detected using two sensing electrodes that are formed in the support substrate side. The sensing electrodes are arranged symmetrically from the rotation center of the proof mass at same distances. Therefore, the proof mass rotates corresponding to acceleration applied in the third direction (z-direction) which is perpendicular to the support substrate plane. In one of the sensing electrodes, which is arranged in a position where the proof mass is approached to the support substrate, the capacitance is increased. On the contrary, in the other sensing electrode, which is arranged in the opposite side symmetrically with the rotation center of the proof mass, and in a position where the proof mass is away from the support substrate, the capacitance is decreased. By detecting the capacitance of these two sensing electrodes with differential detection, electric signals proportional to the acceleration applied in the third direction can be obtained.

The acceleration sensor of PTL 2 below is configured such that a proof mass rotates around a first or second direction, similarly to the acceleration sensor of PTL 1. A sensing electrode is arranged in a cap layer side. In PTL 2, weight is unbalanced by removing a part of the proof mass to realize the rotation of the proof mass and a displacement of the proof mass in the third direction. Therefore, the acceleration sensor of PTL 2 can match the rotation center of the proof mass with center of the cavity, where the cavity is formed by surrounding the proof mass with a support substrate and a cap layer. That is, two sensing electrodes are arranged symmetrically with respect to a geometrical center of the proof mass and the center of the cavity. By arranging the electrodes as such, two sensing electrodes can be displaced uniformly even when distortion arises in an acceleration detection element due to change in circumference temperature, where the sensing electrodes are made of support substrate, proof mass, and a cap layer. Therefore, the capacitance change of the sensing electrode arising from the distortion can be cancelled with the differential detection and can be separated from a signal of an applied acceleration. As a result, an acceleration sensor having small zero point drift, which is caused by mounting or environmental temperature change, can be provided.

In PTL 3 below, a cavity is configured by arranging a support substrate and a cap layer so as to sandwich a proof mass from the upper and lower sides. For purpose of inhibiting deformation of the cavity due to external factors such as environmental temperature change, multiple posts are arranged for connecting the support substrate, a device layer, and the cap layer.

In an acceleration sensor of PTL 4 below, a conductor is formed for penetrating a support substrate or a cap layer as a means for providing an electric signal to a proof mass.

CITATION LIST

Patent Literature

PTL 1: JP H09-189716 A
PTL 2: JP 2008-544243 A
PTL 3: JP 2000-019198 A
PTL 4: JP 5105968 B2

SUMMARY OF INVENTION

Technical Problem

In a typical technology for reducing a cost of an acceleration sensor, a cavity is configured by surrounding a proof mass with a support substrate and a cap layer to protect the proof mass from an external physical force. An acceleration detection element is connected with a signal processing IC using a conductive wire. Then, the acceleration detection element is packaged with a package made by press molding an inexpensive thermosetting resin.

In order to input/output an electric signal between the proof mass and the signal processing IC, where the proof mass is surrounded with the support substrate and the cap layer, the proof mass and the signal processing IC needs to be connected mechanically and electrically. For example, a conductive electrode material (penetration electrode) penetrating the support substrate or the cap layer shall be formed so as to reach a device layer.

In the acceleration sensor of PTL 1, the sensing electrode is formed in the signal processing IC side. Thus, pressure during mounting or deformation of a package may have small influence on sensor performance even when an inexpensive packaging technology is employed such as press molding of the thermosetting resin. However, in order to establish mechanical and electric connections between a part on which the proof mass is formed and a signal processing IC (for example, when a component of the signal processing IC needs to be arranged corresponding to the part on which the proof mass is formed), it can be easily considered that complicated design and production technologies are required.

In the acceleration sensor of PTL 2, center of a cavity and rotation center are matched, and sensing electrodes are arranged in equal distances from the rotation center. Thus, even when an inexpensive packaging technology such as press molding of thermosetting resin is employed, initial zero point offset or zero point variation due to over time stress mitigation is expected to be inhibited. However, in order to match the center of the cavity and the rotation center, complicated production process is needed. For example, a penetration hole shall be formed in a part of a proof mass for unbalancing the weight, and then plates shall be bonded together for securing sufficient facing area of the sensing electrodes.

In an acceleration sensor of PTL 3, in order to reduce deformation of a cap layer and a support substrate, multiple posts are arranged for connecting the cap layer and a device layer on which the support substrate and the proof mass are formed. However, the arrangement of the post reduces the facing area of the sensing electrodes which is disadvantageous for downsizing the sensor.

The present invention is made in view of the above problems, and the object is to provide a highly reliable acceleration sensor with small initial or over time zero point drifts even when the sensor is used in a poor installation environment while keeping low production cost.

Solution to Problem

According to an acceleration sensor of the present invention, a proof mass is arranged inside a cavity surrounded by a support substrate and a cap layer, wherein the proof mass rotates when acceleration is applied in z-direction. The cap layer is formed such that weights per unit area are different in both sides of the rotation axis of the proof mass.

Advantageous Effects of Invention

According to an acceleration sensor of the present invention, zero point drifts resulting from an environmental change or an over-time change can be inhibited.

BRIEF DESCRIPTION OF DRAWINGS

FIGS. 6A and 6B are diagrams illustrating an analysis result of deformation of a cap layer 100 and fixed side electrodes C1B, C2B with finite element method, when pressure of several hundred Mpa is applied to the cap layer 100.

FIG. 7 is a plan view illustrating main components of an acceleration sensor S2 according to a second embodiment.

DESCRIPTION OF EMBODIMENTS

In the following embodiments, the embodiment may be split into multiple section or embodiments as a matter of convenience for discussion as necessity. However, unless clearly mentioned, they are not irrelevant with each other. One embodiment can be a partial or an entire modification, a detailed embodiment, or a supplemental explanation of the other embodiment.

In the following embodiments, when it is referred to a number of an element (including number of articles, numerical value, quantity, and range), the number shall not be limited to a specific number and can be less or more than the specific number, unless clearly mentioned or when the number is clearly limited to the specific number in principle.

In the following embodiments, components thereof (including element steps) are not mandatory unless clearly mentioned or when clearly considered to be mandatory in principle.

In the following embodiments, when a discussion is related to geometry of a component or spatial relation, the present invention includes the geometries or relations that are substantially the same or similar to thereof, unless clearly mentioned or when clearly considered to be not included. This is same to the numerical values or ranges mentioned above.

In the all drawings for illustrating the embodiments, basically, the same reference number is assigned for the same component, and repetitive explanation thereof is omitted as much as possible. Regarding the drawings, for ease of understanding, hatching may be used even in a plan view. The embodiment of the present invention will be discussed with reference to the drawings.

<First Embodiment>

Figure 1:
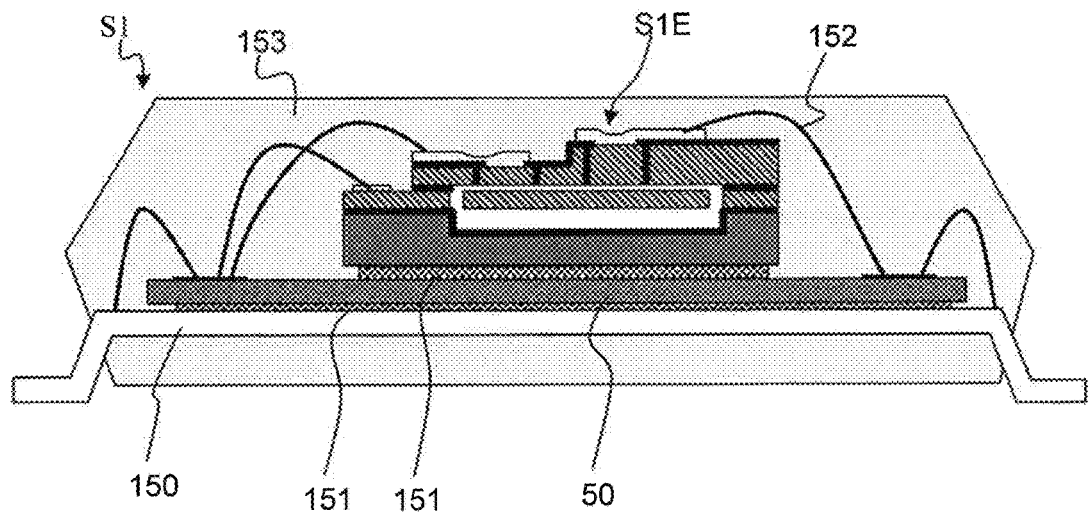
FIG. 1 is a schematic diagram illustrating an entire configuration of an acceleration sensor S1 according to a first embodiment.

FIG. 1 is a schematic diagram illustrating an entire configuration of an acceleration sensor S1 according to the first embodiment of the present invention. The acceleration sensor S1 includes an acceleration detection element S1E, a signal processing IC (Integrated Circuit) 50, a lead frame 150, and a conductive wire 152. The conductive wire 152 electrically connects the acceleration detection element S1E, the signal processing IC 50, and the lead frame 150. The signal processing IC 50 and the acceleration detection element S1E are fixed respectively on the lead frame 150 and the signal processing IC 50 using an adhesive 151.

The acceleration sensor S1 is made by press molding a thermosetting resin 153, and then covering each component. The acceleration sensor S1 is incorporated into an upper level system, and provides detected physical quantity information to the upper level system.

Figure 2:
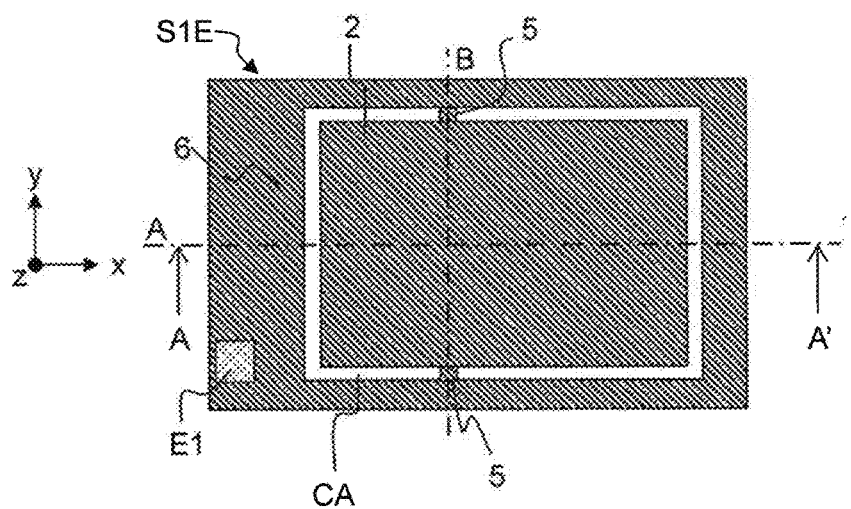
FIG. 2 is a plan view illustrating a proof mass 2 equipped in an acceleration detection element S1E and circumferential configuration.

FIG. 2 is a plan view illustrating a proof mass 2 equipped in the acceleration detection element S1E and the circumferential configuration. The figure is a plan view of a device layer 1c where a cap layer 100, which will be discussed with FIG. 3, is removed.

The acceleration detection element S1E includes the proof mass 2 which is process-formed with a method discussed later. The proof mass 2 is hung to a fixing part 6 via a torsion beam 5, and thus configured to rotate around y-direction (second direction). The fixing part 6 is fixed to a support substrate 1a via an intermediate insulating layer 1b discussed later. Therefore, the proof mass 2 rotates around the second direction in proportion to an acceleration applied in a third direction (z-direction), and is displaced toward the third direction. A pad E1 will be discussed later.

Figure 3:
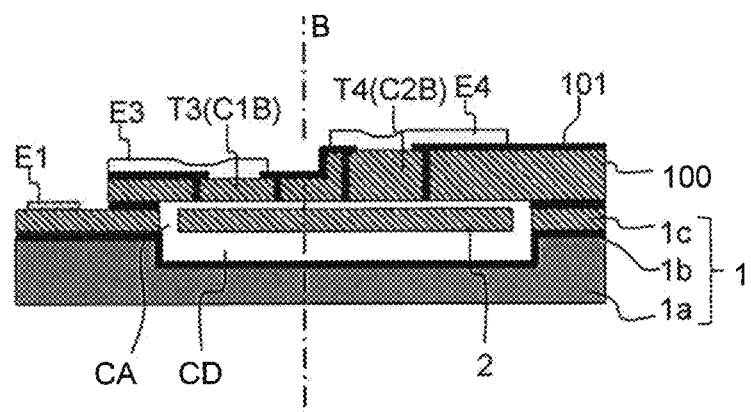
FIG. 3 is an A-A' sectional view of FIG. 2.

FIG. 3 is an A-A' sectional view of FIG. 2. The acceleration detection element S1E includes, for example, a SOI (Silicon On Insulator) substrate 1 for forming mechanical components such as the proof mass 2 and the fixing part 6. The SOI substrate 1 comprises: an intermediate insulating layer 1b formed on a support substrate 1a; and a device layer 1c formed on the intermediate insulating layer 1b. The support substrate 1a is formed with silicon (Si), for example. The intermediate insulating layer 1b is formed, for example, with silicon oxidize (SiO2). The device layer 1c is formed, for example, with conductive silicon.

The total thickness of the support substrate 1a and the intermediate insulating layer 1b is several hundred microns, for example. The thickness of the device layer 1c is several microns to several ten microns. In the present first embodiment, the SOI substrate is employed; however, semiconductor substrate other than the SOI substrate can be used. For example, conductive polysilicon using surface MEMS technology, or plated metal such as nickel (Ni) can be used as the device layer 1c.

The SOI substrate 1 can be formed also by: processing a cavity CD on the support substrate 1a; forming thereafter the intermediate insulating layer 1b with thermal oxidation; and bonding the device layer 1c.

Each component of the acceleration detection element S1E is formed by processing the device layer 1c and the cap layer 100. Methods for processing the device layer 1e and the cap layer 100 can be as follows. A resist which reacts to light or electron beam is coated on the device layer 1c or the cap layer 100. Then a part of the resist on the device layer 1c or the cap layer 100 is removed using photolithography or electron beam drawing technology. Next, the exposed device layer 1c or the cap layer 100 is removed with dry etching technology using RIE (Reactive Ion Etching) or with wet etching technology using alkaline medicine such as TMAH and KOH. Thereafter, the residual resist is removed so that each components, which will be discussed later, can be formed on the device layer 1c and the cap layer 100.

Inside the cap layer 100, fixed side electrodes C1B, C2B are formed for measuring displacement of the proof mass 2. The proof mass 2 takes a role of a drive side electrode. The fixed side electrodes C1B, C2B and the drive side electrode form sensing electrodes C1, C2 which will be discussed later with FIG. 4. The sensing electrodes C1, C2 are arranged such that when capacitance of one electrode is decreased corresponding to motion of the proof mass 2, capacitance of the other is increased. Therefore, use of differential detection system, which will be discussed later with FIG. 4, allows obtaining an output that is proportional to an applied acceleration. Details of each element constituting the circuit will be discussed later.

As indicated near the rotation center B of the proof mass 2, the cap layer 100 is provided with a step. Due to this step, rigidity are different between the left side and right side of the rotation center B. The reason will be discussed later with FIG. 6(a) and FIG. 6(b).

The cap layer 100 is a layer for protecting the proof mass 2, the torsion beam 5, and the sensing electrodes C1, C2 from external shocks, mechanical contacts, and dusts. The cap layer 100 has a trench formed using dry etching technology. The trench is embedded with insulation films 101 such as thermal oxidation film. This maintains airtightness of a cavity CD which is surrounded by the cap layer 100 and the support substrate 1. The cap layer 100 can be split into multiple parts that are electrically separated with each other, by forming the trench in the cap layer 100 and embedding the insulation film 101.

The penetration electrodes T3, T4 illustrated in FIG. 3 are formed by splitting the cap layer 100 with the trench and the insulation film 101. The penetration electrodes function as the fixed side electrodes C1B, C2B. The insulation film 101 can be formed, for example, by thermal oxidation after the formation of the trench, or by CVD (Chemical Vapor Deposition).

When the cap layer 100, which is formed with the insulation film 101 and the penetration electrodes T3, T4, is bonded with the SOI substrate 1, to where the proof mass 2 and the torsion beam 5 are formed, the proof mass 2 can be protected from external mechanical contacts and dusts. The examples of bonding method are as follows. (a) An eutectic bonding method including: coating alloys such as gold and tin, between the cap layer 100 and the device layer 1c; and then stiffing by heat treatment. (b) A room temperature surface activation bonding method including: activating the surfaces of the cap layer 100 and the device layer 1c with plasma; and bonding directly each silicon or each silicon oxide film. (c) A direct bonding method for bonding each silicon or each silicon oxide film including: washing two surfaces with mixed solution of acid and pure water; producing hydroxyl group on the surfaces; then performing hydrogen bonding of the hydroxyl group in normal temperature; and heating in high temperature.

In order to electrically connect the proof mass 2, the fixed side electrodes C1B, C2B with a signal processing IC 50, which will be discussed later, pads E1, E3, E4 are formed. Each of the pads E3, E4 is connected respectively with the penetration electrodes T3, T4. The signal processing IC 50 can input/output electric signals with the proof mass 2 and the fixed side electrodes C1B, C2B via the pads E1, E3, E4.

Figure 4:
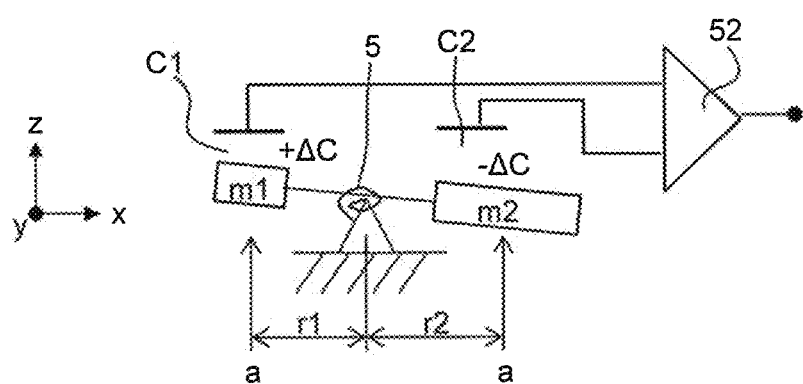
FIG. 4 is a diagram illustrating an operation principle of the acceleration sensor S1.

FIG. 4 is a diagram illustrating an operation principle of the acceleration sensor SI. The proof mass 2 is formed so that the weights thereof are different in both sides of the central axis (torsion beam 5) in the first direction (x-direction). That is, when acceleration is applied in the third direction (z-direction), a force (F1) received by a proof mass 2 (m1) in the left side of the torsion beam 5, and a force (F2) received by a proof mass 2 (m2) on the right side have mutually different values. Further, distance (r1) from center of gravity of the left side part of the proof mass 2 to the beam 5, and distance (r2) from center of gravity of the right side part of the proof mass 2 to the beam 5 are different. Therefore, moment M working on the torsion beam 5, which is rotation center of the proof mass 2, is unbalanced (does not become zero). Accordingly, the proof mass 2 rotates around the second direction (y-direction), centering the torsion beam 5, in proportion to acceleration (a) applied in the third direction (z-direction). Equation 1 shown below indicates the moment M arising in the torsion beam 5 when the acceleration (a) is applied in the third direction. When rigidity of the torsion beam 5 is defined as k, the arising angle □ (displacement of the proof mass 2 toward the third direction) can be defined as Equation 2 shown below.

$$M = m1 \cdot a \cdot r1 - m2 \cdot a \cdot r2 = F1 \cdot r1 - F2 \cdot r2 \neq 0 \quad \text{(Equation 1)}$$

$$\Theta = M/k \quad \text{(Equation 2)}$$

A CV (Capacitance to Voltage) conversion circuit 52, which will be discussed later, converts displacement arising in the third direction (change of capacitance) into electric signal (voltage) by performing differential detection using two sensing electrodes C1, C2, whose capacitance changes corresponding to displacement generated in the third direction. The penetration electrodes T3, T4 that are formed in a part of the cap layer 100 as the fixed side electrodes C1B, C2B of the sensing electrodes C1, C2 form capacitance between the proof mass 2. The CV conversion circuit 52 detects the change of the capacitance.

In order to displace the proof mass 2 corresponding to the applied acceleration in the third direction, the torsion beam 5 (rotation center) shall be arranged in a position away from the center of gravity of the proof mass 2. In order to secure linearity of sensor output against the applied acceleration, the sensing electrodes C1, C2 are formed in equal intervals in the first direction viewing from the torsion beam 5 and with same capacitance. Therefore, inevitably, the sensing electrodes C1, C2 are arranged in positions away from the center of the cavity CA formed with the support substrate 1a and the cap layer 100.

In order to realize a circuit configuration mentioned above, the penetration electrodes T3, T4, which take the role of the fixed side electrode C1B, C2B, are arranged in equal distances from the torsion beam 5 (rotation center of the proof mass the first direction (x-direction). The arrangements are made such that capacitance formed with left side part of the proof mass 2 centering the beam 5 and the fixed side electrode C1B is equal to capacitance formed with right side part of the proof mass 2 and the fixed side electrode C2B.

Figure 5:
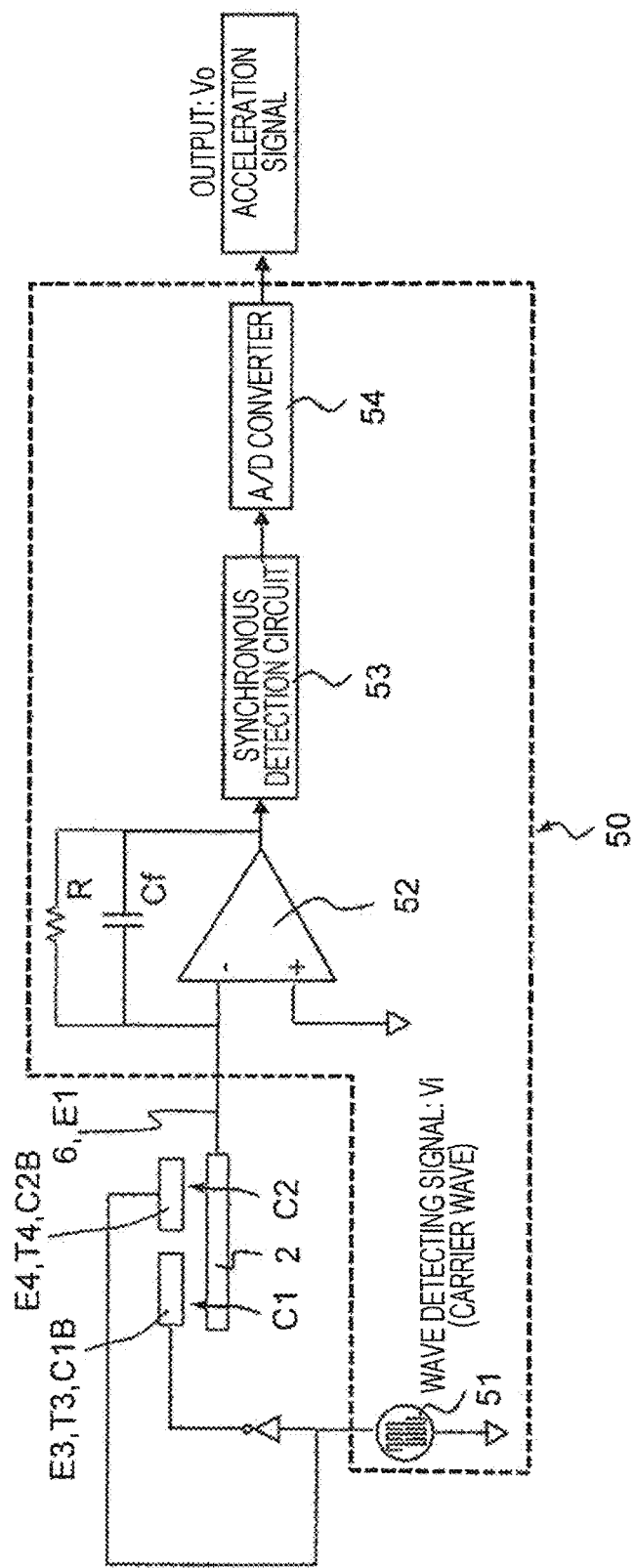
FIG. 5 is a circuit diagram of signal processing IC 50.

FIG. 5 is a circuit diagram of the signal processing IC 50. The signal processing IC 50 applies a subcarrier 51 to the fixed side electrodes C1B, C2B via the pads E3, E4. The proof mass 2 is connected to the input terminal of the CV conversion circuit 52 via the torsion beam 5, the fixing part 6, and the pad E1. This allows detecting capacitance change formed between the proof mass 2 and the fixed side electrodes C1B, C2B.

A synchronous detection circuit 53 processes an output signal from the CV conversion circuit 52 using a frequency of the subcarrier 51 to restore amplitude and frequency following a motion of the proof mass 2. An A/D translation part 54 converts this result into a digital signal. Therefore, a signal Vo, which is proportional to an acceleration applied to the proof mass 2, is output.

<First Embodiment: Cap Layer 100>

For cost reduction, the acceleration sensor S1 uses a package made by press molding the thermosetting resin 153. Thus, the acceleration detection element S1E shall receive pressure which arises during the press molding of the thermosetting resin 153. Therefore, zero point drift may arise at the time of shipment of the acceleration sensor S1. Further, internal stress variates inside the thermosetting resin 153 during the package formation. For example, the internal stress is mitigated over time with changes of environmental temperature or humidity. As a result, zero point drift may arise even after the shipment of the acceleration sensor S1.

In order to solve the above mentioned problem, in the present first embodiment, the cap layer 100 is provided with a step such that rigidity of a part corresponding to the fixed side electrode C1B and rigidity of a part corresponding to the fixed side electrode C2B are mutually different. The detailed configuration will be discussed below.

FIG. 6(a) and FIG. 6(b) are diagrams illustrating an analysis result of deformation of a cap layer 100 and fixed side electrodes C1B, C2B with finite element method, when pressure of several hundred Mpa is applied to the cap layer 100. FIG. 6(a) illustrates the analysis result when the cap layer 100 has no step t. FIG. 6(b) illustrates the analysis result when the cap layer 100 has the step t. Arrangement of the step t allows thinning the part corresponding to the fixed side electrode C1B compared to the part corresponding to the fixed side electrode C2B. Therefore, rigidity is weakened and deformation may arise easily.

As illustrated in FIG. 6(a), when the cap layer 100 has no step t, an inflection point of deformation of the cap layer 100 is positioned in the center of the cavity CA. Thus, the fixed side electrodes C1B, C2B, that are arranged symmetrically centering the rotation center B, have mutually different displacement amounts in the third direction (z-direction). Therefore, the capacitance change ΔC1, ΔC2 of the sensing electrodes C1, C2 have mutually different amounts. As a result, the sensor will output a value not equal to zero which is not an expected value as initial zero point.

As illustrated in FIG. 6(b), when the cap layer 100 has the step t, the inflection point of deformation of the cap layer 100 is positioned just above the rotation center B of the proof mass 2. As a result, displacement amounts of the fixed side electrodes C1B, C2B in the third direction (z-direction) become mutually different. Therefore, the capacitance change ΔC1, ΔC2 of the sensing electrodes C1, C2 become the same amounts. Since these variations are cancelled with differential detection, the sensor output becomes a proper expected value.

The arrangement of the step t in the cap layer 100 allows, not only inhibiting an initial sensor output (zero point offset) which arises during the press molding of the thermosetting resin 153, but can also inhibit an output drift (variation) of the acceleration sensor S1 in the following cases: (a) when an internal stress inside the thermosetting resin 153 is mitigated over time and the capacitance change ΔC1, ΔC2 variate; (b) when a hardening resin 153 is expanded by absorbing moisture from environment and the capacitance change ΔC1, ΔC2 variate; or (c) when a mounting stress or distortion arises during an allocation of the lead frame 150 on a specific substrate with soldering, or when the mounting stress or distortion variates over time, and the capacitance change ΔC1, ΔC2 variate.

<First Embodiment: Conclusion>

As discussed above, in the acceleration sensor S1 according to the present first embodiment, each part of the cap layer 100 corresponding to the fixed side electrodes C1B, C2B has mutually different thickness. Specifically, the part corresponding to the fixed side electrode C1B arranged in the lighter side of the proof mass 2 centering the rotation center B is formed thinner compared to the part corresponding to the fixed side electrode C2B arranged in the heavier side. Therefore, displacement amounts of each sensing electrode C1, C2 which arise during press molding of the thermosetting resin 153 can be equalized. The displacement amounts can be cancelled with differential detection. Therefore, initial zero point or over time zero point variation of the acceleration sensor S1 can be inhibited. The over time zero point variation is subject to environmental temperature, humidity, and the mitigation of internal stress of the thermosetting resin 153.

In the present first embodiment, an example of packaging using press molding of the thermosetting resin 153 is discussed. However, the present invention shall not be limited to the packaging method that press molds the thermosetting resin 153. It shall be noted that similar advantage can be obtained in a package such as ceramic package, where an acceleration detection element S1E is inserted in a container having a certain geometry and then covered. This is because, the acceleration detection element S1E is made of composite of thin layers with different materials, such as the support substrate 1a, the intermediate insulating layer 1b, the device layer 1c, the cap layer 100, the lead frame 150, the signal processing IC 50, and the adhesives 151. Since linear expansion coefficient of each material differs, distortion arises with environmental temperature change.

In the present first embodiment, as a matter of convenience, the cap layer 100 is thinned in the left side of the rotation center B, where the cavity CA is small so that position of the inflection point is adjusted to the rotation center B. Similar effect can be expected even when the cap layer 100 in the right side of the rotation center B is thickened. It shall be noted that the number of the step t does not have to be one. Similar effect can be obtained by splitting the step into multiple and arrange like slits (not illustrated). The steps can also be configured in multi-level steps.

In the present first embodiment, the cavity CA is formed with a plate-shaped proof mass 2, which is in a simplest geometry, and a crevice surrounding the proof mass 2 with an equal interval (minimum size). Therefore, processing and production process are simple and the area can be used efficiently, which is advantageous for downsizing.

<Second Embodiment>

FIG. 7 is a plan view illustrating main components of an acceleration sensor S2 according to the second embodiment of the present invention. FIG. 7 illustrates a state where the cap layer 100 is removed similarly to FIG. 2. In the followings, the contents which are already discussed with regard to the acceleration sensor S1 of the first embodiment will not be discussed. The parts that are modified or added will be discussed essentially.

The method of manufacturing the acceleration sensor S2 is similar to that of the acceleration sensor S1 of the first embodiment. The difference from the first embodiment is that: a proof mass 2 is arranged surrounding a fixing part 6, in other words, the fixing part 6 is formed inside the proof mass 2; and the fixing part 6 and a signal processing IC 50 are connected electrically via penetration electrodes T1, T2. The penetration electrodes T1, T2 are configured so as to mechanically connect the device layer 1c and the cap layer 100, and have the role of posts that inhibit deformation of the cap layer 100 due to an external pressure application.

In an acceleration detection element S2E of the acceleration sensor S2, the fixing part 6 is formed inside the proof mass 2. A torsion beam 5 is formed so as to extend toward the second direction from the fixing part 6. The proof mass 2 is connected to the tip part of the torsion beam 5. The fixing part 6 is fixed to a support substrate 1a via an intermediate insulating layer 1b near central part of a cavity CA formed with a support substrate 1a and the cap layer 100 surrounding the proof mass 2.

Figure 8:
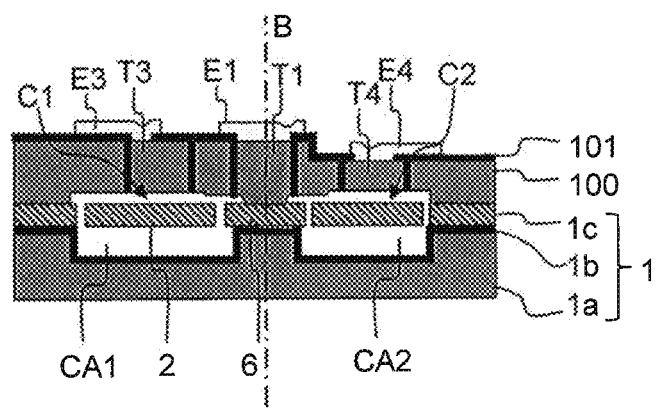
FIG. 8 is an A-A' sectional view of FIG. 7.
Figure 9A:
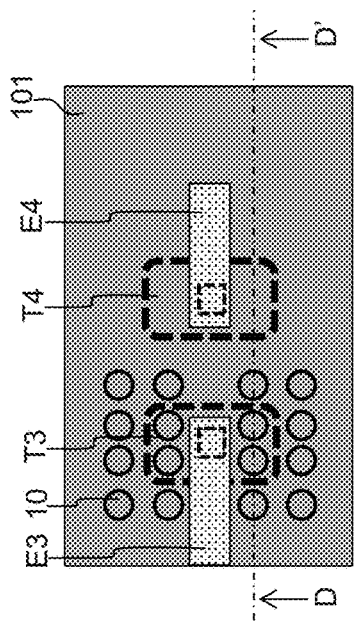
FIGS. 9A to 9D are diagrams illustrating a configuration of an acceleration sensor according to a third embodiment.
Figure 9B:
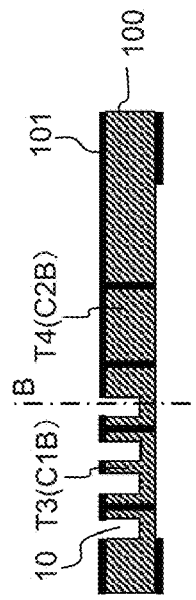
Figure 9C:
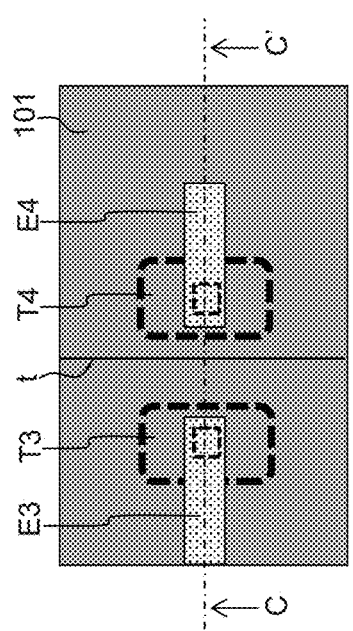
Figure 9D:
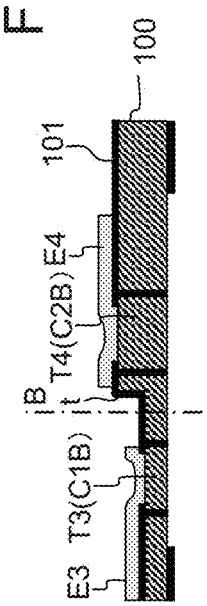

FIG. 8 is an A-A' sectional view of FIG. 7. Similarly to the acceleration sensor S1 of the first embodiment, in the acceleration sensor S2, penetration electrodes T3, T4 functioning as the fixed side electrodes C1B, C2B are formed on the cap layer 100 for detecting displacement of the proof mass 2. The penetration electrodes T3, T4 define capacitance with the proof mass 2. Pads E3, E4 are formed on the penetration electrodes T3, T4 to electrically connect with the signal processing IC 50.

The penetration electrodes T1, T2 penetrate the cap layer 100 from the upper part of the fixing part 6 to reach the fixing part 6. The penetration electrodes T1, T2 are arranged along the rotation axis B. The pad E1 is connected to the penetration electrodes T1, T2. The signal processing IC 50 input/outputs electric signal via the pad E1 and the penetration electrodes T1, T2. Thus, the electric signal is transmitted to the proof mass 2 via the fixing part 6. In order to input/output an electric signal with the proof mass 2, one penetration electrode is enough. However, arrangement of multiple penetration electrodes allows forming a closed loop for inspecting connection quality between the cap layer 100 and the device layer 1c.

The arrangement of penetration electrodes T1, T2 along the rotation axis (line B, or torsion beam 5) can inhibit deformation of the cap layer 100 and the accompanying capacitance change of sensing electrodes C1, C2, even when an inexpensive thermosetting resin 153 is used for a packaging material. In other words, the penetration electrodes T1, T2 have the role for connecting electrically the proof mass 2 and the signal processing IC 50, as well as the role for preventing a collapse of the cap layer 100.

In order to measure the displacement of the proof mass 2 in the third direction (z-direction), a part of the cap layer 100 is formed as the penetration electrodes T3, T4, to utilize them as the fixed side electrodes C1B, C2B. Therefore, when the thermosetting resin 153 is press molded, capacitance of the sensing electrodes C1, C2 also change corresponding to deformation of the cap layer 100. The acceleration detection element S2E is configured as a laminated structure of multiple different materials using: a silicon for the support substrate 1a; an oxidized silicon for the intermediate insulating layer 1b; and metal materials such as aluminum for the pads E1, E3, E4. Therefore, it can be easily considered that the capacitance change of the sensing electrodes C1, C2 may arise by deformation of the acceleration detection element S2E or the cap layer 100 due to change of environmental temperature.

Theoretically, the capacitance change of the sensing electrodes C1, C2 can be cancelled by followings: arranging the sensing electrodes C1, C2 symmetrically with the torsion beam 5 (line B as the rotation center) with equal intervals in the first direction (xx-direction) and same capacitance; forming a step t in the cap layer 100 similarly to the first embodiment; matching an inflection point of deformation of the cap layer 100 to the rotation center; applying a positive subcarrier to the sensing electrode C1; applying a negative subcarrier to the sensing electrode C2; and inputting the total to the CV conversion circuit 52 and perform differential detection.

However, when the deformation amount of the acceleration detection element S2E or the cap layer 100 is large, the distance between the proof mass 2 and the penetration electrodes T3, T4 becomes short. Here, the proof mass 2 is the movable side electrodes, and the penetration electrodes T3, T4 are the fixed side electrodes of the sensing electrodes C1, C2. Therefore, two electrodes may contact each other. Even when these electrodes do not contact each other, problems may arise such as: abnormal increase of sensor sensitivity; deterioration of linearity of sensor output; and deterioration of tolerance to environmental vibration.

The zero point output of the sensor in an initial stage can be compensated electrically (Non-variable zero point output in a product shipment stage: zero point output is a sensor output when no acceleration is applied to the sensor which is expected to be zero). However, in a package using the thermosetting resin 153, an internal stress arises inside the resin during press molding. Since this internal stress is mitigated with time, deformation amount of the cap layer 100 changes over time. Further, the volume of the thermosetting resin 153 changes corresponding to environmental moisture. That is, the deformation amount of the cap layer 100 changes depending on the environmental moisture. These zero point drifts which are effected by environmental and over time factors cannot be compensated electrically.

To solve the above mentioned problem, initial and over time variation of the sensing electrodes C1, C2 shall be inhibited. Further, even when there are variations, the variation amounts shall be set to same between C1, C2 so that they can be cancelled each other.

One specific method is: arranging multiple penetration electrodes T1, T2 along the rotation axis (torsion beam 5) to take the role of posts for minimizing deformation of the cap layer 100; providing a step t in the cap layer 100 so that capacitance variation of the sensing electrodes C1, C2 becomes the same even when deformation arises; and can cancelled using differential detection. Such configuration shall be useful.

The acceleration sensor S2 has following structures: (Configuration a) a fixing part 6 arranged near central part of a cavity CA; (Configuration b) multiple posts (penetration electrodes T1, T2) arranged on the fixing part 6 along the rotation axis; (Configuration c) sensing electrodes C1, C2 arranged symmetrically with a torsion beam 5 (rotation axis: line B) in the first direction (x-direction) in equal intervals and same capacitance; and (Configuration d) a cap layer 100 formed with a step t such that capacitance change of the sensing electrodes C1, C2 become same even when the cap layer 100 deforms. The advantages of the (Configuration a) through (Configuration d) will be discussed below.

The fixing part 6 and the beam 5 are arranged near the center of the cavity CA (line B in FIG. 7), and the penetration electrodes T1, T2 are arranged on the fixing part 6 along the rotation axis (line B), This prevents cap layer 100 from collapsing, even when pressure is applied externally, and minimizes the deformation. Further, since the cap layer 100 has the step t, capacitance change of the sensing electrodes C1, C2 become the same even when deformation arises in the cap layer 100. Therefore, an influence of the deformation can be cancelled by differential detection.

It is easily considered that deformation amount of the cap layer 100 can be reduced by thickening the cap layer 100. However, in order to form penetration electrodes T1, T2, T3, T4, a narrow trench shall be processed in the cap layer 100. Further, in order to secure airtightness, insulation films 101 (insulation films in the left and right side of the penetration electrodes T1, T2, T3, T4 of FIG. 7 and FIG. 8) shall be embedded. Generally, for mass production reason, the thickness ratio of the trench width and the cap layer 100 shall be 20 or less. Therefore, thickening the cap layer 100 is restricted from viewpoint of mass production. In the second embodiment, width of the trench is several microns, and thickness of the cap layer 100 is 100 microns to 400 microns.

The sensing electrodes C1, C2 are arranged symmetrically with the torsion beam 5 (line B) along the first direction (x-direction) with equal intervals and same capacitance. Thickness of the cap layer 100 in the cavity CA2 side, having shorter length in the first direction from the rotation center (line B) is formed thinner than the thickness of the cap layer 100 in the cavity CA1 side in the opposite side. That is, rigidity of the fixed side electrodes C1B, C2B of the sensing electrodes C1, C2 in the third direction are adjusted to be substantially the same. Therefore, even when the cap layer 100 deforms with an external application of pressure or circumference environment variation, the capacitance variation of the sensing electrodes C1, C2 become the same, and the influence can be cancelled with differential detection.

<Second Embodiment: Conclusion>

As discussed above, in the acceleration sensor S2 according to the present second embodiment, the penetration electrodes T1, T2, arranged for applying an electric signal to the proof mass 2, can be also utilized for a post for supporting the cap layer 100. Therefore, deformation of the cap layer 100 can be reduced. Further, the step t is provided in the cap layer 100. This can cancel the variation of capacitance of the sensing electrodes C1, C2 arising from external pressure or environmental variation. Therefore, stability of zero point output of a sensor can be improved.

In the first and second embodiments, it is discussed that the arrangement of the step t in the cap layer 100 allows equalizing the capacitance variation amounts of the sensing electrodes C1, C2. The essence of the first embodiment is that, the inflection point of the cap layer 100 matches the rotation center (line B). The essence of the second embodiment is that, rigidity of the penetration electrodes T3, T4 are set to same. In other words, by adjusting rigidity of the penetration electrodes T3, T4 corresponding to the sizes of the cavities CA1, CA2, deformation amounts due to external application of pressure or environmental variation can be equalized. Therefore, besides arranging the step t in the cap layer 100, as long as an inflection point of the cap layer 100 and rigidity of the fixed side electrodes C1B (T3), C2B (T4) can be adjusted, similar advantages can be obtained similarly to the first and second embodiments. Specific example will be discussed in the following third embodiments.

<Third Embodiment>

In the third embodiment of the present invention, as a method for adjusting an inflection point of the cap layer 100 or rigidity of the fixed side electrodes C1B, C2B, a technique different from the configurations discussed in the first and second embodiments will be discussed.

FIG. 9(*a*) to FIG. 9(*d*) are diagrams for illustrating a configuration of an acceleration sensor of the present third embodiment. FIG. 9(*c*) is a plan view of the acceleration sensor of the present third embodiment, and illustrates a state where the cap layer 100 is removed similarly to FIG. 2. FIG. 9(*d*) is a D-D' sectional view of FIG. 9(*c*). FIG. 9(*a*) is a plan view of the acceleration sensor S1 of the first embodiment, and for comparison, is shown neighboring FIG. 9(*c*). FIG. 9(*b*) is a C-C' sectional view of FIG. 9(*a*).

In FIG. 9(*a*) to FIG. 9(*d*), in order adjust an inflection point of the cap layer 100, holes 10 are used instead of the step t. The holes 10 are formed from the insulation film 101 side toward a proof mass 2 along the third direction (z-direction) so as not to penetrate the cap layer 100. Other configurations are similar to the first and second embodiments.

The inflection point of the cap layer 100 can be adjusted variously by adjusting arrangement, size, pitch, and depth of the holes 10. Specifically, rigidity of the cap layer 100 in the left side of the rotation axis B can be weakened compared to the right side by forming more holes 10 in the left side of the rotation axis B compared to the right side. Further, use of the holes 10 can maintain thickness of the cap layer 100 uniform unlike the case the step t is arranged. Therefore, the insulating layer 101, the pads E3, E4, which are arranged on the cap layer 100, can be formed with a more convenient manufacturing method.

In the present third embodiment, as a method for adjusting rigidity of the cap layer 100, a cylindrical hole 10 which does not penetrate the cap layer 100 is provided in the cap layer 100. However, it shall be noted that similar advantage can be obtained by using a square shaped or a belt (groove) shaped hole, and shall not be limited to the circular hole.

Figure 10A:
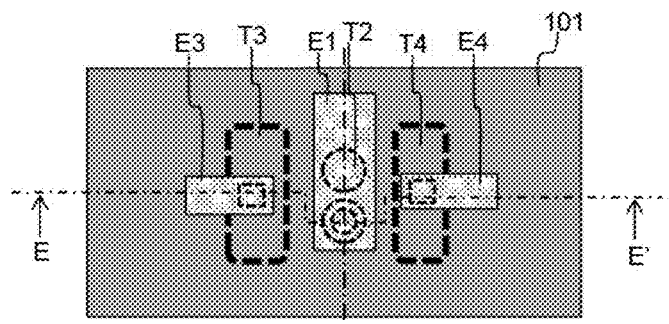
FIGS. 10A and 10B are diagrams illustrating an exemplified configuration where a cap layer 100 is provided with a groove 11 instead of a step t for adjusting an inflection point of the cap layer 100.
Figure 10B:
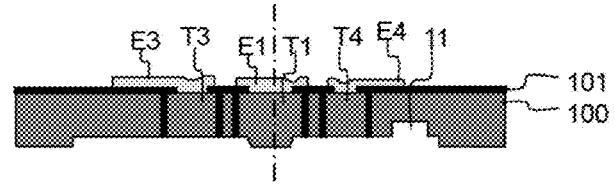

FIG. 10(a) and FIG. 10(b) are diagrams illustrating an exemplified configuration where the cap layer 100 is provided with a groove 11 instead of the step t, for adjusting an inflection point of the cap layer 100. FIG. 10(a) is a plan view of the cap layer 100. FIG. 10(b) is an E-E' sectional view of FIG. 10(a). In FIG. 10(a) and FIG. 10(b), the groove 11 is formed in the bottom surface of the cap layer 100 in the cavity CA side. This configuration assumes an arrangement of the fixing part 6 discussed in the second embodiment; however, the groove 11 can be provided in the configuration discussed in the first embodiment as well.

Figure 11A:
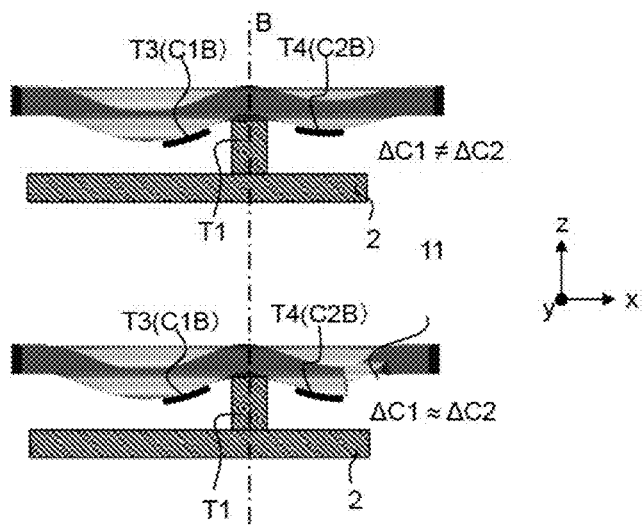
FIGS. 11A and 11B are diagrams illustrating an analysis result of deformation of the cap layer 100 with finite element method.
Figure 11B:

FIG. 11(a) and FIG. 11(b) are diagrams illustrating an analysis result of deformation of the cap layer 100 with finite element method. FIG. 11(a) illustrates an analysis result when there is no groove 11. FIG. 11(b) illustrates an analysis result when there is a groove 11.

As illustrated in FIG. 11(a), when there is no groove 11, displacement amount of the penetration electrodes T3, T4 in the third direction (z-direction) are different to each other. Therefore, the capacitance change ΔC1, ΔC2 take mutually different value, and an influence of deformation of the cap layer 100 cannot be cancelled by differential detection. This result appears as an output of the acceleration sensor, and thus a certain signal is outputted even when an acceleration is not applied. Therefore, an expected value of zero point cannot be acquired.

As illustrated in FIG. 11(b), the arrangement of the groove 11 allows equalizing displacement amounts of the penetration electrodes T3, T4 in the third direction. Therefore, the capacitance change ΔC1, ΔC2 take mutually same value, and the influence of deformation of the cap layer 100 can be cancelled by differential detection.

<Third Embodiment: Additional Notes for Hole 10 and Groove 11>

All of the depressions for adjusting the inflection point and rigidity of the cap layer 100 such as the hole 10 and the groove 11, are arranged so as not to lie in a trench, which separates the fixed side electrodes C1B, C2B from the surrounding silicon, and the insulation film 101.

When the hole 10, the step t, and the groove 11 are formed so as to lie in the insulating layer 101 which is embedded in the trench, production steps which are different from the first and second embodiments are required for removing oxidized silicon constituting the silicon of the cap layer 100 and the insulating layer 101. For example, in order to remove the silicon, SF6 is used as a reactant gas. In order to remove the oxidized silicon film, CHF3 is used as a reactant gas. Therefore, production process becomes somewhat complicated. When the depressions such as the hole 10 and the groove 11, are formed so as not to lie in the trench, only the silicon have to be processed. Therefore, the production process can be simplified.

As illustrated in FIG. 9(a) to FIG. 9(d), when the depressions such as the hole 10 and the groove 11, are formed from the outside of the cap layer 100 (side not facing the proof mass 2) toward the proof mass 2 along the third direction so as not to penetrate the cap layer 100, distance between the proof mass 2 and the fixed side electrode C1B or C2B is not influenced by an existence of the depression. Therefore, in this case, as illustrated with the holes 10 of FIG. 9(c), the depression can be arranged in a position overlapping the fixed side electrode C1B or C2B with regard to the third direction (z-direction) position (inner side part which is surrounded by the dotted line in FIG. 9(c)). The depression can be also arranged in a position which does not overlap (outer side part which is not surrounded by the dotted line of FIG. 9(c)). Therefore, an inflection point and rigidity of the cap layer 100 can be adjusted widely without influencing the capacitance of the sensing electrodes C1, C2.

As illustrated in FIG. 10(a) and FIG. 10(b), when the depressions such as the holes 10 and the grooves 11, are processed from the inner side of the cap layer 100 (side facing the proof mass 2) towards an opposite side along the third direction so as not to penetrate the cap layer 100, the holes 10 or the grooves 11 will be positioned between the proof mass 2 and the fixed side electrode C1B or C2B. Therefore, the capacitance formed with the sensing electrodes C1, C2 and the proof mass 2 is influenced depending on the positions of these depressions. Thus, in such case, the depressions shall be arranged in positions that do not overlap with the fixed side electrode C1B or C2B with regard to the third direction (z-direction). In this case, flexibilities for adjusting an inflection point and rigidity of the cap layer 100 are decreased compared to a case where the depressions are formed from the outer side of the cap layer 100 towards the inner side. On the other hand, the pads E1, E3, E4 are not necessarily arranged on the depressions. Thus, formation and arrangement of the pads E1, E3, E4, and wirings become easier.

<Modified Example of the Present Invention>

The present invention shall not be limited to the above mentioned embodiments, and shall include various modifications. The above mentioned embodiments are described in detail for plainly explaining the present invention. It does not mean that the present invention shall comprise all compositions discussed above. For example, in the above mentioned embodiment, the step t, the hole 10, and the groove 11 are exemplified as a means for adjusting rigidity of the cap layer 100. However, even when a structure other than those above are applied, similar advantage is considered to be obtained as long as weight per unit area of the cap layer 100 in the XY-plane can be configured differently in the both sides of the rotation axis B.

In the above first through third embodiments, it is discussed that an inflection point and rigidity of the cap layer 100 can be controlled using the step t, the hole 10, and the groove 11. Further, displacement amounts of the fixed side electrodes T3 (C1B), T4 (C2B) in the third direction can be adjusted as well. However, it shall be noted that these methods are not limited to mutually independent methods, and can be modified variously without deviating the spirit of the present invention. For example, these depressions can be formed on the front or rear side of the cap layer 100 by combining the hole 10 and the groove 11. Further, as necessity, the steps t can be combined as well.

In the above first through third embodiments, as a matter of convenience for discussion, a packaging technology using a thermosetting resin 153 is discussed. However, since the acceleration detection elements are made of multiple materials, deformation of the acceleration detection element due to difference in linear expansion coefficient can be easily predicted. Therefore, concept of the present invention is useful in various package technologies which deal with deformation of the acceleration detection element itself or distortion during mounting, such as ceramic package, and pre-mold package which fabricates a plastic beforehand and mount a component therein.

The present invention is useful in wide fields, for example: posture detection in an automobile or robot; blur compensation in camera; posture and direction detection in navigation; and posture detection sensor in game machine.

Specifically, the advantage can be expected to be seen in use of mobile device, or when there is heat source nearby such as engine, motor, electromagnet, and microcomputer.

REFERENCE SIGNS LIST

S1-S2 acceleration sensor
1a support substrate
1b intermediate insulating layer
1c device layer
2 proof mass
5 torsion beam
6 fixing part
C1-C2 sensing electrode
C1B fixed side electrode of sensing electrode
C2B fixed side electrode of sensing electrode
CA cavity
CA1 cavity
CA2 cavity
T1-T2 penetration electrode (post)
T3-T4 penetration electrode (fixed side electrode of sensing electrode)
E1-E4 pad
101 insulation film
50 signal processing IC
51 subcarrier
52 CV conversion circuit
53 synchronous detection circuit
54 A/D translation part
100 cap layer
150 lead frame
151 adhesives
152 wire
153 thermosetting resin

The invention claimed is:

1. An acceleration sensor for detecting acceleration, comprising:
    a support substrate arranged in a plane defined with a first direction and a second direction that are perpendicular to each other;
    a fixing part, including a clearance part, arranged on the support substrate;
    a cap layer covering the clearance part;
    a proof mass arranged in a cavity, the cavity being formed with the support substrate and the cap layer surrounding the clearance part;
    a beam part bridging between the fixing part and the proof mass; and
    a first and second sensing electrodes, formed as a part of the cap layer, arranged on both sides of the beam part, each of the electrodes forming capacitance between the proof mass, wherein
    the proof mass is configured to rotate around the beam part as a rotation axis, when an acceleration is applied in a third direction which is perpendicular to the first and second directions, and is configured such that the weights of the proof mass are different in both sides of the rotation axis,
    the cap layer is formed such that weight per unit area in a plane defined with the first and second directions are mutually different in the both sides of the beam part, and
    the weight per unit area of the cap layer is lighter in the lighter-weight side of the proof mass centering the rotation axis, compared to the weight per unit area of the cap layer in the heavier-weight side of the proof mass.

2. The acceleration sensor as claimed in claim 1, wherein
    the cap layer includes a trench that splits the cap layer into multiple parts by penetrating the cap layer for electrically separating each other, and
    the cap layer further includes a depression, and the depression does not penetrate the cap layer and does not lie in the trench.

3. The acceleration sensor as claimed in claim 2, wherein
    the cap layer has multiple depressions formed in both sides of the beam part with different numbers in the both sides, such that the cap layer is formed with different weights per unit area in the both sides of the beam part.

4. The acceleration sensor as claimed in claim 3, wherein
    the first and second sensing electrodes are formed by splitting the cap layer with the trench, and
    the depression is formed from a side of the cap layer not facing the proof mass toward the proof mass along the third direction.

5. The acceleration sensor as claimed in claim 3, wherein
    the first and second electrodes are formed by splitting the cap layer with the trench, and
    the depression is formed from a side of the cap layer not facing the proof mass toward the proof mass along the third direction, and is arranged in a position not overlapping the first and second sensing electrodes with regard to the third direction.

6. The acceleration sensor as claimed in claim 1, further comprising:
    a circuit for detecting acceleration that detects capacitance formed between the proof mass and the first and second sensing electrodes with differential detection.

7. The acceleration sensor as claimed in claim 1, wherein
    the proof mass is formed so as to surround the fixing part in a plane defined with the first and second directions, the fixing part being arranged on the rotation axis, and
    the acceleration sensor further includes a penetration electrode that penetrates the cap layer and contacts with the fixing part.

8. The acceleration sensor as claimed in claim 7, further comprising:
    a circuit for inputting/outputting an electric signal with the proof mass via the penetration electrode, the electric signal being a signal necessary for detecting capacitance formed between the proof mass and the first and second sensing electrodes, or a signal necessary for driving the proof mass.

9. The acceleration sensor as claimed in claim 1, wherein
    the support substrate, the proof mass, and the cap layer are formed with silicon.

10. The acceleration sensor as claimed in claim 1, wherein
    the support substrate, the proof mass, and the cap layer are configured as an acceleration detection element for detecting acceleration,
    the acceleration sensor further includes a package formed with press molded thermosetting resin, and
    the package packages the acceleration detection element.

11. The acceleration sensor as claimed in claim 10, further comprising:
    a circuit for transmitting/receiving an electric signal with the acceleration detection element, wherein
    the circuit is arranged on a lead frame,
    the acceleration detection element is arranged on the circuit, and
    the circuit and the acceleration detection element are connected by a conductive wire.

12. The acceleration sensor as claimed in claim 1, wherein
    the cap layer has parts having different thickness with regard to the third direction such that the weights per unit area in the both sides of the beam part are different.

* * * * *